United States Patent

Manzo

[11] Patent Number: 5,992,350
[45] Date of Patent: Nov. 30, 1999

[54] CAT LITTER CATCHING TRAY

[76] Inventor: Fredda Manzo, 28111 Oak Springs Canyon Rd., Canyon Country, Calif. 91351

[21] Appl. No.: 08/866,206

[22] Filed: Jun. 13, 1997

[51] Int. Cl.[6] ................................................ A01K 1/035
[52] U.S. Cl. ............................................. 119/165
[58] Field of Search ..................... 119/165, 166, 119/170; D30/161

[56] References Cited

U.S. PATENT DOCUMENTS

| | | | |
|---|---|---|---|
| D. 346,677 | 5/1994 | Casmira ............................. | D30/161 |
| D. 351,693 | 10/1994 | Sutton ................................ | D30/161 |
| D. 351,694 | 10/1994 | Evans ................................. | D30/161 |
| D. 373,663 | 9/1996 | Walter ............................... | D30/161 |
| 3,246,630 | 4/1966 | Dearing et al. ................... | 119/165 |
| 3,476,083 | 11/1969 | Wall .................................. | 119/165 |
| 3,885,523 | 5/1975 | Coleman ........................... | 119/165 |
| 4,021,975 | 5/1977 | Calkins ............................. | 119/165 |
| 4,029,048 | 6/1977 | Gershbein ......................... | 119/165 |
| 4,766,845 | 8/1988 | Bavas ................................ | 119/165 |
| 4,819,580 | 4/1989 | Foldes .............................. | 119/165 |
| 5,042,430 | 8/1991 | Casmira ............................ | 119/165 |
| 5,092,277 | 3/1992 | Baillie et al. .................... | 119/165 |
| 5,134,974 | 8/1992 | Houser ............................. | 119/168 |
| 5,165,366 | 11/1992 | Harvey ............................. | 119/165 |
| 5,195,464 | 3/1993 | Mutter .............................. | 119/165 |
| 5,218,930 | 6/1993 | Casmira ............................ | 119/165 |
| 5,220,886 | 6/1993 | Hyde ................................. | 119/165 |
| 5,329,878 | 7/1994 | McCauley ......................... | 119/165 |
| 5,361,725 | 11/1994 | Baillie et al. .................... | 119/165 |
| 5,388,550 | 2/1995 | Noble ............................... | 119/165 |
| 5,460,122 | 10/1995 | Reinartz ........................... | 119/165 X |

Primary Examiner—Robert P. Swiatek
Assistant Examiner—Elizabeth Shaw
Attorney, Agent, or Firm—Patterson, Belknap, Webb & Tyker LLP

[57] ABSTRACT

An apparatus for use with a litter box is described which is in the form of a tray with a wall along each side and across the front edge to facilitate the containment of excess kitty litter. The walls taper to the floor at the back end of the tray. The back edge, which is blocked off by the litter box during use, is flat to facilitate in the ease of disposal of contained litter and the portion of the tray extending beyond the litter box. The length of the tray may be matched to the size of existing litter boxes available on the market to permit use with an owners current litter control system. The tray easily slides up or back permitting the possibility of an infinite number of tray lengths. The surface of the tray may be textured or ridged to facilitate the removal of the excess litter from the paws of the animals in a contained area as they exit the litter box.

5 Claims, 1 Drawing Sheet

CAT LITTER CATCHING TRAY

BACKGROUND OF THE INVENTION

1. Field of the Invention

The present invention relates generally to the field of animal waste disposal and more specifically to a tray for use in connection with a cat litter box.

2. Description of the Prior Art

Owners of domesticated animals are often required to provide a box so the animal can eliminate waste within the home, e.g., a cat litter box. A problem that goes along with the box is that a sandy mess can occur in front of the cat litter box. The litter from the box is often tracked about the area where the box is stored when the animal covers its waste products or enters or leaves the box.

Commercially available litter boxes have sand guards and a hooded top to help minimize the litter from falling into the surrounding area. As the development of the cat litter box progressed, the sand guard and the hooded top both improved the neatness of the litter box area. However, while the sand guard and the hooded top both partially restrict sand from flying out of a cat box while a cat is using the box, there remains a need for products which stop the cat from tracking the sand which sticks to their paws out of the box after use. The bulk of the sand usually falls off within the first step or two a cat takes after leaving the box.

Prior attempts have been made to reduce the amount of litter which lands outside of the litter box area. Typically, this has been done by a non-adjustable physical barrier, ledge or panel. U.S. Pat. Nos. 5,092,277 and 5,042,430 display a tray-like area raised above ground level. Not only may some cats be unable to jump to a raised platform, they may also be reluctant to step on a tray attached to the upper portion of the sides of the litter box.

U.S. Pat. Nos. 5,361,725, 5,220,886, 5,165,366, 3,885,523, 3,246,630, Des. 346,677 and Des. 351,684 all display a tray apparatus which is non-adjustable.

U.S. Pat. No. 351,693 displays a non-adjustable tray with a ridge on the front edge of the tray only which may permit sand to easily fall off the open side edges.

U.S. Pat. Nos. 5,218,930 and 4,766,845 both display trays of narrow width which cats may be likely to step over completely.

U.S. Pat. No. 5,388,550 consists of a covered litter box with a screen covered debris compartment and a vanity panel extending in front of the access opening. While this prevents the animal from jumping over the screen, the apparatus requires some disassembling and reassembling for clean-up of the excess litter.

U.S. Pat. No. 5,195,464 shows an attached double tray which allows much of the sand to fly over the top of the litter box during use and the apparatus will not adjust to either room or cat size.

U.S. Pat. No. 3,476,083 discloses a pan member 12 which supports a shell for holding cat litter. The pan member 12 does not act to remove litter sand from the cat's paws, but provides aeration of the shell and allows the replenishment of deodorant materials.

U.S. Pat. No. 5,329,878 shows a litter container adapted for use by a pot belly pig with a ramp structure which allows the pig to enter and leave the container. The ramp is not adjustable.

SUMMARY OF THE INVENTION

It is my contention that the sand from the litter box which is tracked out by the cat could be removed from the cat's paws and contained in an easy to use, infinitely adjustable tray whereby cleanup is greatly eased for the area surrounding the cat box and making life with a cat box overall a more pleasant experience.

Accordingly, the present invention is directed to a litter tray for an animal which comprises a tray to catch litter from an enclosed area for containing a quantity of animal litter such as a cat litter box. The tray has a base, a front end, and two side walls, wherein said side walls are adapted to accept the bottom of said litter container and said litter container is optionally moveable between the two side walls along the length of said tray.

Accordingly, it is an object of the present invention to provide a tray which fits under a cat litter box by itself or used in conjunction with a hooded top which catches and contains excess litter which sticks to the bottom of cats paws after litter box use and also catches litter which falls out of the box while the box is in use.

It is an other object to provide a litter catching tray which is simple in construction and economical to manufacture.

It is still another object of the invention to provide a tray which permits ease in the clean-up of the excess litter as the tray's tapered side ridges allow the sand to be easily dropped first to the side ridge and then along the edge of the tray into trash receptacles of various sizes.

It is yet another object of the invention to provide a textured surface on the tray which facilitates the removal of excess kitty litter by adding resistance to the litter as the cats paws pass over the floor of the tray.

It is a further object of the invention to provide a tray in which the adjustability is infinitely variable allowing the owner to choose the best setting, depending upon the room size and cat size.

It is still a further object of the invention to provide a tray which is convenient for cats to use including small kittens and cats who may have restricted movement.

It is yet a further object of the invention to provide a tray which is economical to purchase and fits under an existing cat litter box system thereby not requiring purchase of an entire new litter system.

It is an additional object of the invention to provide an excess litter catching tray which is achievable in an esthetically simple, non-bulky apparatus.

It is still another object of the invention to provide a tray which may be easily and rapidly installed and easily moved to a new location.

It is yet an additional object of the invention to provide a tray which is easily stacked and stored by store owners for convenience in sales and storage of stock.

These and other features and advantages of the present invention will become apparent to those skilled in the art upon a reading of the following detailed description when taken in conjunction with the drawings wherein there is shown and described an illustrative embodiment of the invention.

DETAILED DESCRIPTION OF THE PREFERRED EMBODIMENT

Figure 1:
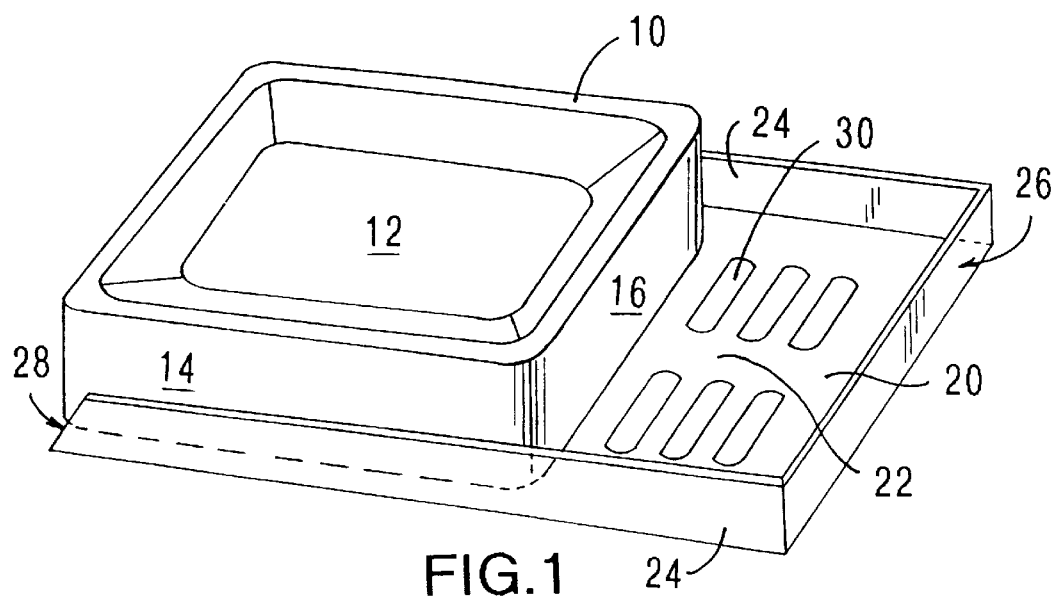
FIG. 1 is a top perspective view of a litter box with the litter catching tray.

Referring to the drawings, and particularly to FIG. 1, there is illustrated a litter container assembly constructed in accordance with the principles of the present invention. The litter container assembly can be used by any animal which ordinarily uses any conventional litter container. However, the litter container assembly is particularly well-suited for accommodating cats.

The litter container assembly includes a litter container 10 which has an enclosed area for containing a quantity of animal litter 12. The litter container 10 also has two sides 14 and a front end 16.

The inventive litter container assembly also comprises a tray 20 for catching litter from said container. The tray 20 for catching litter comprises two side walls 24, although one may do in certain circumstances, and one end wall 28. The side walls 24 define an area which preferably should be as wide or wider than the litter container 10 so that the litter container may be well seated on the tray 20 (and, possibly, catch spillage from the sides if desired). Preferably, the back 28 should allow the tray to slide under the litter container. Alternatively, the back may have a wall or ridge to hold the litter container 10 in place and provides a stop wherein the container 10 cannot be moved any further. The front end of the tray 20 has a wall 26 which requires the animal to step off the tray and minimizes spillage off the tray. The base of the tray 22 extends a distance away from the front wall 16 of the litter container 10.

Optionally, the tray 20 is covered with a textured surface 30 or is ridged (not shown) to more readily clean the cat's paws.

Figure 2:
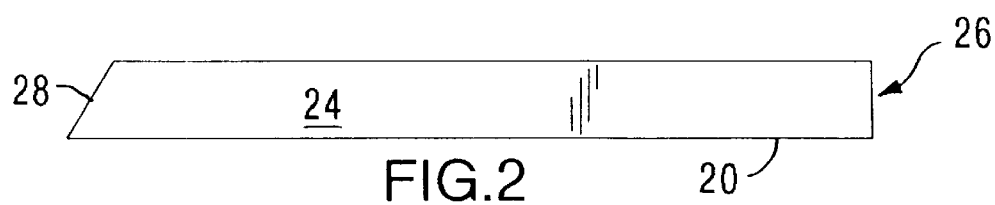
FIG. 2 is a side view of the litter catching tray.

Turning to FIG. 2, the litter tray 20 comprises side walls 24, front 26 and back edge 28. The side walls 24 and front wall 26 are shown to be uniform in height, but it will readily be appreciated that these heights may be varied (e.q., only a lip) and may differ one to another. The walls, or any portion of them, may be beveled.

Figure 3:
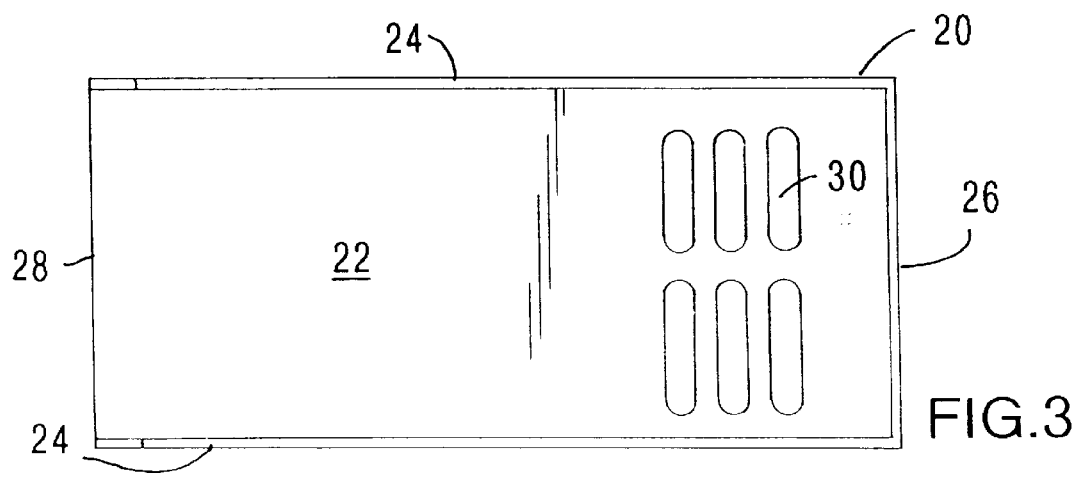
FIG. 3 is a top view of the litter catching tray.

FIG. 3 shows a top view of the litter tray. The optional textured surface 24 may be arranged in any variety of shapes and/or patterns to meet aesthetical and/or functional criteria.

The tray 20 is adapted in size to be able to fit any litter container as those are known in the art. The tray 20 is made of any length which results in a portion of the tray extending out from the front of the litter container 10.

It is thought that the present invention and its advantages will be understood from the foregoing description and it will be apparent that various changes may be made thereto without departing from its spirt and scope of the invention or sacrificing all of its material advantages, the form hereinbefore described being merely preferred or exemplary embodiment thereof.

I claim:

1. A tray for catching litter from a litter container, said container having a bottom and at least three side walls for containing a quantity of litter, said tray comprising a base which is larger in at least one direction than said litter container, at least one end wall, and at least one tapered side wall, wherein said tray is adapted to accept said litter container.

2. The litter tray of claim 1 wherein said base further comprises a textured surface.

3. The litter tray of claim 1 wherein said base is ridged.

4. The litter tray of claim 1 wherein said end wall is at the front of the litter tray.

5. The litter tray of claim 1 wherein said tray has two end walls.

\* \* \* \* \*